ered to a temperature not exceeding 250° C. insufficient to cause fusion and agglomeration, while subjecting it to an atmosphere containing chlorin and oxygen, thereby oxidizing the iron and chlorinating the other metal and the metalloid, and vaporizing and separating the metalloid chlorid from the oxidized iron and chlorinated metal.

UNITED STATES PATENT OFFICE.

COURT C. TITUS, OF HELENA, MONTANA, ASSIGNOR TO MONTANA METALLURGICAL COMPANY, OF HELENA, MONTANA, A CORPORATION OF MONTANA.

PROCESS OF TREATING COMPLEX REFRACTORY ORES OF SILVER AND GOLD.

1,111,976.

Specification of Letters Patent. Patented Sept. 29, 1914.

No Drawing. Application filed December 14, 1910. Serial No. 597,222.

*To all whom it may concern:*

Be it known that I, COURT C. TITUS, a citizen of the United States, residing at Helena, in the county of Lewis and Clarke and State of Montana, have invented certain new and useful Improvements in Processes of Treating Complex Refractory Ores of Silver and Gold, of which the following is a specification.

U. S. Letters Patent No. 739,374, granted September 22, 1903, to Charles E. Baker and Arthur W. Burwell, describe a process of treating ores of gold and silver containing base metals and metalloids, which consists in combining the metalloids with chlorin and vaporizing and separating the metalloid chlorids from the base metals in the ore. Any iron in the ore is thereby converted into protochlorid, which remains in the mass under treatment, the supply of chlorin being so restricted as to prevent the production of the more volatile ferric chlorid. There are however many ores containing silver, lead, zinc, copper, etc., which carry so much iron in the form of sulfid that this process is not commercially available for their treatment, on account of the large amount of chlorin required to combine with the iron.

I have found that by treating such ores with a mixture of chlorin and air, the iron contained therein may be largely converted into its oxid instead of into the chlorid, while the other metals are very completely combined with chlorin.

According to my preferred process, the ore is crushed to about 20 mesh, is dried by heating it in a rotary drum, and is thence delivered into one end of a long narrow inclined revolving cylinder. A mixture of dry chlorin gas and air is introduced into the other end of this cylinder, converting the iron into its oxid and the other metals and the metalloids into their chlorids. The metalloids chlorids, e. g., of sulfur, arsenic, or antimony, are volatilized and are either allowed to escape from the upper end of the cylinder or are collected and condensed. The treatment with chlorin and air is continued for several hours, the ore meanwhile gradually moving downward through the cylinder and discharging from its lower end. While the reactions evolve considerable heat, I prefer to apply heat to the lower end of the cylinder and to finally raise the ore to as high a temperature as possible without causing it to partially fuse and agglomerate, say to 240-250° C.

The iron is found in the product in the form of smooth, glazed, reddish or blackish magnetic particles or masses, which have become oxidized to such extent during the earlier stages of the treatment as to prevent the chlorin from attacking the iron at the higher temperatures subsequently used. The ore may then be treated in any appropriate manner to recover the metals, as by magnetically separating the oxidized iron and dissolving and separately precipitating the chlorinated metals.

I claim:

1. The process of treating ores containing iron, another metal, and a metalloid, which consists in agitating and heating the ore and reacting on it at increasing temperatures not to exceed 250° C. with a gaseous mixture containing chlorin and oxygen, thereby oxidizing the iron and chlorinating the other metal and the metalloid, and vaporizing and separating the metalloid chlorid from the oxidized iron and chlorinated metal.

2. The process of treating ores containing iron, another metal, and a metalloid, which consists in agitating the ore and finally heating it to a temperature not exceeding 250° C. insufficient to cause fusion and agglomeration, while subjecting it to an atmosphere containing chlorin and oxygen, thereby oxidizing the iron and chlorinating the other metal and the metalloid, and vaporizing and separating the metalloid chlorid from the oxidized iron and chlorinated metal.

3. The process of treating ores containing iron, another metal, and a metalloid, which consists in agitating the ore and finally heating it to a temperature of about 250° C., while subjecting it to an atmosphere containing chlorin and oxygen, thereby oxidizing the iron and chlorinating the other
5 metal and the metalloid, and vaporizing and separating the metalloid chlorid from the oxidized iron and chlorinated metal.

In testimony whereof, I affix my signature in presence of two witnesses.

COURT C. TITUS.

Witnesses:
  IRA T. HIGHT,
  CHARLES E. PEW.